Dec. 27, 1932.  V. TORRES ET AL  1,892,370
DEVICE FOR MAKING EDIBLE CONFECTIONS
Filed July 1, 1929
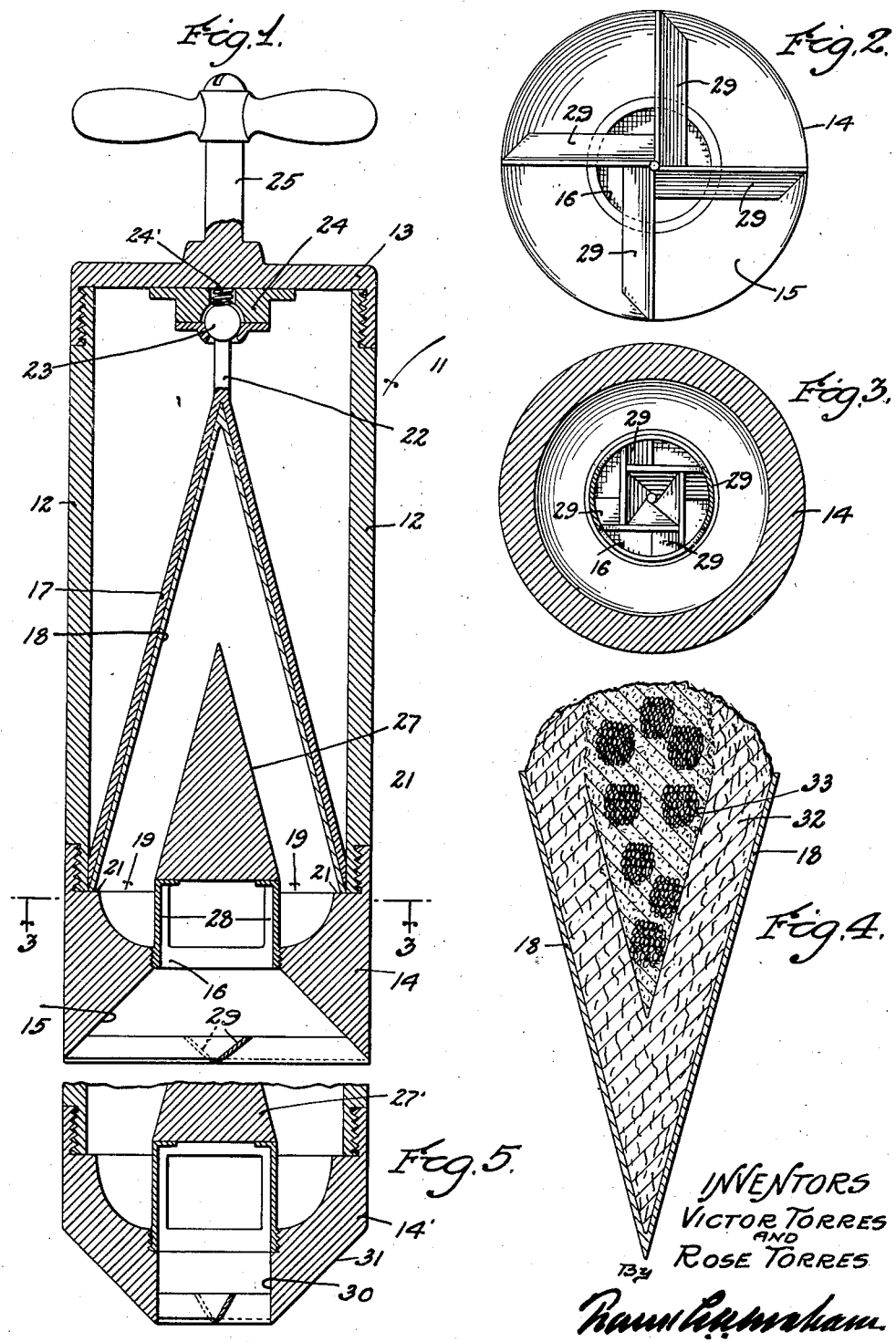
INVENTORS
VICTOR TORRES
AND
ROSE TORRES
ATTORNEY Patented Dec. 27, 1932

1,892,370

UNITED STATES PATENT OFFICE

VICTOR TORRES AND ROSE TORRES, OF SAN GABRIEL, CALIFORNIA

DEVICE FOR MAKING EDIBLE CONFECTIONS

Application filed July 1, 1929. Serial No. 375,009.

This invention has to do with ice cream cones, and is more specifically directed to a device for filling edible cones with ice cream in a manner such that the ice cream is provided with a central depression or cavity adapted to receive a flavoring ingredient, such as fruit, syrup, nuts or the like.

It is a primary object of our invention to produce a device of the class described which is of simple form and construction and which may be economically manufactured and easily operated.

It is a noteworthy feature of our invention that the cone which is being filled is supported within the filling device during the filling operation and that the cone itself is practically filled with ice cream, as contrasted with the usual ice cream cone in which the ice cream is placed upon the top of the cone by means of a suitable scoop.

It is also an object of our invention to produce a device of the class described, in which the ice cream may be considered as being flaked and thrown into the interior of the cone, the recess mentioned above being obtained through the use of a core which is mounted upon a cutting head below the blades.

Although the invention is described above as being directed primarily to a device for filling ice cream cones, in view of the novelty of the product produced through the use of our invention, we also desire to secure protection upon the product which is, in effect, an edible confection consisting of an ice cream cone sundae, comprising an edible shell filled with ice cream, the ice cream being provided with a recess which contains a flavoring ingredient.

The details in the construction of a preferred form of my invention will be best understood from the following description of the accompanying drawing, which is chosen for illustrative purposes only, and in which Fig. 1 is a sectional elevation, showing a preferred form of my invention.

Fig. 2 is an inverted plan view of the device shown in Fig. 1.

Fig. 3 is a plan section which may be considered as having been taken substantially in the plane represented by the line 3—3 in Fig. 1.

Fig. 4 is a sectional elevation of an ice cream cone which has been filled by means of the device shown in Fig. 1, and Fig. 5 is a partial sectional elevation, showing a modified form of cutting head.

More particularly describing the invention, as herein illustrated, reference numeral 11 indicates a body member which is shown as being in the form of a tubular section 12, having a cap member 13 and a head member 14 removably attached to opposite ends thereof.

The head member 14 is shown as being provided with a conical depression 15, which terminates in an aperture 16 through which ice cream is adapted to pass into the hollow body 11. A shell or cone supporting member 17 is shown as being mounted within the body 11 and is adapted to support an ice cream cone 18 in a position such that the open end 19 thereof is situated adjacent to the aperture 16 in the head.

Although the cone supporting member 17 may be made in various forms, we consider it preferable for the purpose of protecting the shell 18 against breakage to make this member in the form of an elongated cone which extends through the body 11 and has its outer edge in engagement with a shoulder 21 provided on the inner surface of the head 14.

The inner end of the cone supporting member 17 is illustrated as being provided with a short stem 22 which terminates in a ball 23, adapted to be received within a socket 24 which is formed upon the inner surface of the cap 13. This ball and socket joint facilitates the placement and removal of the cone within the cone supporting member, and for the purpose of automatically compensating for various lengths in the cones used in connection with this device, we prefer to provide a yieldable support in the form of a coil spring 24' between the outer end of the ball 23 and the inner surface of the cap 13.

The cap 13 is, of course, provided with a handle 25 for the purpose of operating the device.

For the purpose of providing a recess or depression in the ice cream contained within the cone while it is being filled, we provide a core member 27 which is positioned adjacent the aperture 16 and is illustrated as being in the form of a solid cone, supported by oppositely disposed arms or standards 28, which are mounted within the recess 16 of the head 14.

The standards 28 are spaced apart in a manner such that the ice cream will easily pass between these members and into the cone supported by the member 17.

As mentioned above, we consider it preferable, in the operation of a device of this kind, to provide means for flaking the ice cream so that it may be easily forced into the cone contained within the body 11. Such means are illustrated as being in the form of blades 29 which are positioned transversely across the head member 14 and are arranged to flake the ice cream when the filler is rotated in a clockwise direction.

It will be understood, of course, that the head member 14 may be made in various forms, and, as a modified form thereof, we show in Fig. 5 a head member 14' which, instead of being provided with a conical recess 15 as is the member shown in Fig. 1, is provided with a cylindrical ice cream receiving passage 30, the outer end thereof being provided with a conical surface 31.

The operation of this device will, of course, be substantially the same as the one shown in Figs. 1 to 3, inclusive.

Fig. 4 shows the ice cream cone or shell 18 as having been filled with ice cream 32, the ice cream having a central recess or depression 33 therein which contains a flavoring ingredient in the form of fruit or syrup, such as is ordinarily used in making ice cream sundaes.

It is to be understood that, while we have herein described and illustrated one preferred form of our invention and indicated one modification thereof, the invention is not limited to the precise construction set forth, but includes within its scope whatever changes fairly come within the spirit of the appended claims.

We claim as our invention:

1. A device for filling hollow edible shells with a semi-solid material embodying: a hollow body having an aperture in one end thereof and adapted to support said shell with its open end adjacent said aperture; and a core member in said body with a portion thereof positioned in the open end of said shell.

2. A device for filling hollow edible shells with a semi-solid material embodying: a hollow body having an aperture in one end thereof and adapted to support said shell with its open end adjacent said aperture; a core member in said body with a portion thereof positioned in the open end of said shell; and a handle mounted on said body at the end opposite to said aperture.

3. A device for filling ice cream cones embodying: a hollow body having an aperture in one end thereof; cone supporting means in said body adapted to hold a cone with its open end adjacent said aperture; and a core member mounted in said body near the apertured end thereof and adapted to extend into the open end of a cone supported in said body.

4. A device for filling edible hollow shells with a semi-solid material embodying: a hollow body having an aperture in one end thereof and adapted to support said shell with its open end adjacent said aperture; a core member in said body with a portion thereof positioned in the open end of said shell; and a cutting blade mounted across the apertured end of said body.

5. A device for filling ice cream cones embodying: a hollow body having an aperture in one end thereof; cone supporting means yieldably mounted in said body and adapted to hold a cone with its open end adjacent said aperture; and a core member mounted in said body near the apertured end thereof and adapted to extend into the open end of a cone supported in said body.

6. A device for filling ice cream cones embodying: a tubular body; a cutter head removably mounted on one end of said body; a cone supporting member mounted in said body and adapted to support a cone with its open end adjacent said cutting head; and a core member mounted on said cutting head with a portion thereof extending into the open end of said cone.

7. A device for filling ice cream cone embodying: a tubular body; a cutter head removably mounted on one end of said body; a cone supporting member mounted in said body and adapted to support a cone with its open end adjacent said cutting head; a core member mounted on said cutting head with a portion thereof extending into the open end of said cone; and a transverse blade mounted in said cutting head.

8. A device for filling ice cream cones embodying: a tubular body; a cap removably mounted on one end of said body; a cutting head removably mounted on the opposite end of said body; a cone supporting member swivelly mounted on said cap and adapted to support a cone with its open end adjacent said cutting head; and a core member mounted on said head and having an extending portion thereof in the open end of said cone.

9. A device for filling ice cream cones embodying: a tubular body; a cap removably mounted on one end of said body; a cutting head removably mounted on the opposite end of said body; a cone supporting member swivelly mounted on said cap and adapted to support a cone with its open end adjacent said cutting head; and a core member mounted on said head.

10. A device for filling ice cream cones embodying: a tubular body; a cap removably mounted on one end of said body; a cutting head removably mounted on the opposite end of said body; a cone supporting member swivelly and yieldably mounted on said cap and adapted to support a cone with its open end adjacent said cutting head; and a core member mounted on said head and having an extending portion thereof in the open end of said cone.

11. A device for filling hollow edible shells with a semi-solid material embodying: a body having an aperture therethrough; cone supporting means adapted to hold a cone with its open end adjacent said aperture; a core member arranged to extend into the open end of said cone-supporting means; and a cutter blade arranged across said aperture to cut and force said material through said aperture.

In testimony whereof, the said VICTOR TORRES and ROSE TORRES have hereunto set their hands at Los Angeles, California, this 27th day of June, 1929.

VICTOR TORRES.
ROSE TORRES.